US011853881B2

(12) United States Patent
Navoyan et al.

(10) Patent No.: US 11,853,881 B2
(45) Date of Patent: Dec. 26, 2023

(54) IMAGE ANALYSIS-BASED CLASSIFICATION AND VISUALIZATION OF EVENTS

(71) Applicant: VANADATA INC., Toronto (CA)

(72) Inventors: Zaven Navoyan, Yerevan (AM);
Gevorg Minasyan, Akunq (AM);
Ashot Gasparyan, Yerevan (AM);
Harutyun Kamalyan, Talin (AM);
Mher Sargsyan, Hrazdan (AM);
Mikayel Karapetyan, Whitby (CA);
Davit Karamyan, Goris (AM)

(73) Assignee: VANADATA INC., Toronto (CA)

( * ) Notice: Subject to any disclaimer, the term of this patent is extended or adjusted under 35 U.S.C. 154(b) by 457 days.

(21) Appl. No.: 17/152,822

(22) Filed: Jan. 20, 2021

(65) Prior Publication Data

US 2021/0224572 A1     Jul. 22, 2021

Related U.S. Application Data

(60) Provisional application No. 62/964,115, filed on Jan. 21, 2020.

(51) Int. Cl.
| | |
|---|---|
| *G06K 9/46* | (2006.01) |
| *G06N 3/08* | (2023.01) |
| *G06N 20/00* | (2019.01) |
| *G06V 20/40* | (2022.01) |
| *G06V 20/52* | (2022.01) |
| *G06F 18/214* | (2023.01) |
| *G06V 10/764* | (2022.01) |
| *G06V 10/82* | (2022.01) |

(52) U.S. Cl.
CPC .............. *G06N 3/08* (2013.01); *G06F 18/214* (2023.01); *G06N 20/00* (2019.01); *G06V 10/764* (2022.01); *G06V 10/82* (2022.01); *G06V 20/41* (2022.01); *G06V 20/52* (2022.01); *G06V 20/44* (2022.01)

(58) Field of Classification Search
CPC .......... G06N 20/00; G06N 3/08; G06V 20/52; G06V 20/41; G06V 10/82; G06V 10/764; G06F 18/214; G06K 9/46; G06K 9/00; G06K 9/62; G06K 9/4609; G06K 9/00771; G06K 9/6256; G06K 9/00718
See application file for complete search history.

(56) References Cited

U.S. PATENT DOCUMENTS

| | | |
|---|---|---|
| 7,006,982 B2 | 2/2006 | Sorensen |
| 8,219,438 B1 | 7/2012 | Moon et al. |

(Continued)

*Primary Examiner* — Tuan H Nguyen
(74) *Attorney, Agent, or Firm* — ARLUYS IP, P.C.

(57) ABSTRACT

Techniques are described to detect and classify, with high accuracy, events associated with objects using image data analysis and computer vision. In an embodiment, an image capturing device captures an image of an area, which includes objects such as fixed objects. The process determines that an event associated with an object occurred by providing the captured image as input data to an ML model. The ML model is trained to identify such objects and events associated with the objects. The process determines image coordinate information of the event identified within the image and, based at least on mapping data of the area to the image coordinate information, determines that a fixed object of the area is associated with the event. Metrics may be calculated for the fixed object and detected events.

18 Claims, 13 Drawing Sheets

(56) References Cited

U.S. PATENT DOCUMENTS 9,740,977 B1    8/2017  Moon et al.
9,836,756 B2 *  12/2017  Rider .................... G06V 40/165
2020/0265247 A1 *  8/2020  Musk ..................... G06N 20/00

* cited by examiner

IMAGE ANALYSIS-BASED CLASSIFICATION AND VISUALIZATION OF EVENTS

BENEFIT CLAIM

This application claims the benefit under 35 U.S.C. § 119(e) of provisional application 62/964,115, filed on Jan. 21, 2020, the entire contents of which are hereby incorporated by reference for all purposes as if fully set forth herein.

FIELD OF THE TECHNOLOGY

The invention generally relates to data analysis systems and computer vision; more specifically, the invention relates to image analysis-based classification and visualization of events.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer image analysis has enabled the automatic extraction of useful information from digital images (simply "images" hereafter). The image contains a collection of digital data that captures a description of the site in computer-readable format. Although the information can be readily displayed and viewed on a computer display, the information is not classified. Stated differently, captured image data has no annotation of the objects that it has captured. Presently, there are many techniques that, although computationally heavy, can classify objects.

However, such techniques lack the capability to detect whether an image has captured an event, whereas the detection of events is important for many industries. For example, in the self-driving automotive industry, it may be important not only to detect an object but also the event of the object moving at a certain speed or in a certain direction. In another industry, detecting whether an object is engaging with another object may be necessary.

One approach to solving the computer analysis problem of detecting events is to employ an additional type of sensors. For example, in the automotive industry, a lidar and/or a radar may be employed to detect the speed and direction. However, employing an additional type of sensors is costly and creates challenging technical problems of overlaying the information from the different sensors and the image capturing device to detect and classify an event.

The problem is further exacerbated if an event can be user-defined. The particular type of sensors may not provide the information necessary to detect and classify a new event type.

BRIEF DESCRIPTION OF THE DRAWINGS

In the drawings of certain embodiments in which like reference numerals refer to corresponding parts throughout the figures.

DETAILED DESCRIPTION

Figure 1:
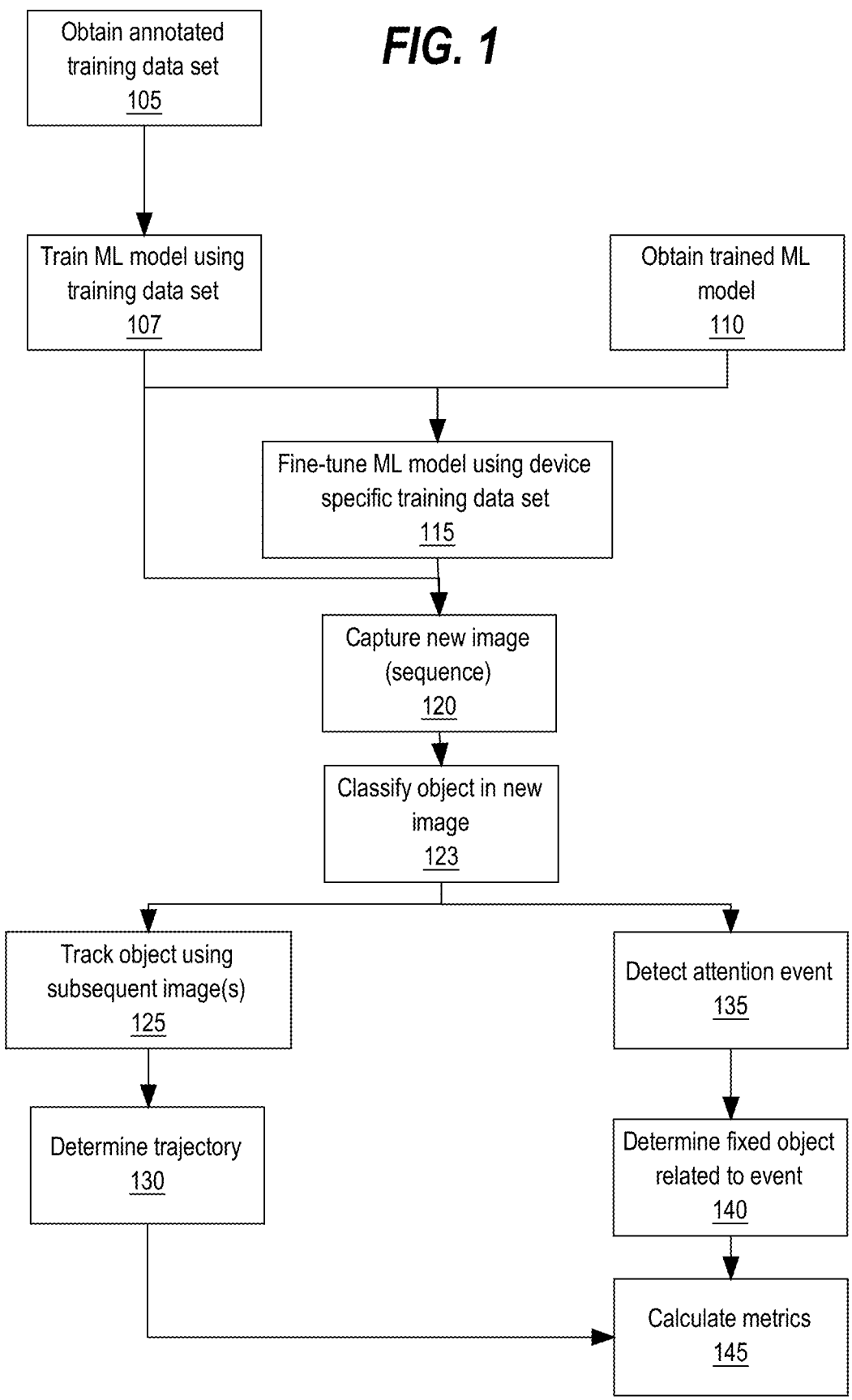
FIG. 1 is a flow diagram that depicts the process for object and event detection and classification for generating metrics, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques using computer vision and machine learning (ML) technologies are described herein to detect and classify, with high accuracy, events associated with objects. The techniques further describe generating unique metrics for the classified events, thereby providing useful information to improve the efficiency of the systems employing these techniques.

In an embodiment, a machine learning model (ML model) is trained to detect and classify objects and determine whether events have occurred associated with such objects. To train an ML model, an annotated set of images is provided as part of a feature vector to a machine learning algorithms to produce a new set of annotations for the images. Based on the difference between the generated annotations and the existing annotations, the weights of the ML model are adjusted. Numerous training iterations may be performed to yield a relatively small margin of error between the generated annotations and the existing annotations to produce the ML model for classification. For example, once trained, the ML model may identify human objects in every image (if any) and return human objects inscribed in rectangles for every image (and the coordinates of that rectangle). A deep convolutional neural network (CNN) algorithm may be used for object detection, which may be trained on a large dataset of images (e.g., COCO, Pascal VOC). Such a data set contains hundreds of thousands of annotated objects, delimited with a box indicating that the object in the box represents persons, etc. The output of the trained CNN model delivers newly identified objects in a frame of a newly captured image. Other non-limiting examples of such machine learning algorithms include a other types of neural networks, random forest, decision tree, and various types of regression algorithms.

Additionally or alternatively, an ML model is trained to identify events. For example, the same ML model that identifies whether an object is a human may be additionally trained to identify whether a human object is paying attention to another object or not. For that purpose, the images in the training data set are annotated in two label categories: persons who pay attention and persons who do not. The ML model trained with such labels may further detect and classify such an event.

In a related embodiment, an ML model trained with images from a particular type of image capturing device is used in fine-tuning for event and object classifications with images captured from another type of image capturing device. The term "fine-tuning" refers herein to adjusting parameter(s) (e.g., weight(s)) for an already trained ML model. For example, an ML model trained by conventional-lensed camera captured images to detect and classify particular object type(s) may be further fine-tuned with images captured from a fish-eye-lensed camera. Because the accuracy of prediction for an ML model depends on the number of annotated images with which the model is trained, this technique allows expanding the training data set for the ML model to better detect and classify objects and related events. Furthermore, the training operation is computationally very expensive. Therefore, leveraging already trained models for conventional-lensed camera images significantly reduces the cost of generating an ML model fine-tuned for fish-eye lensed images, as an example. As a result, the finally obtained fine-tuned ML model works well on 10's of thousand of images obtained from fish-eye cameras.

In an embodiment, the ML model is trained to classify additional object types that may be associated with target event types. For example, for detecting a motion event for a car, the ML model is trained to detect whether an object is moving and whether the object is a car. Additionally, the ML model is trained to classify whether an object is a bicycle. That way, the ML model differentiates whether the moving object event annotated within the image is for a bicycle or a car. Such techniques reduce the error of misclassification of the same event for a wrong object type by the ML model.

In an embodiment, an associated object with the event is determined without ML classification but rather based on the information of the area which is captured in the image. When an image capturing device is taking a sequence of images of the same area, the objects that are fixed may be classified without an ML model. Mapping data may be generated that maps the locations of the fixed objects of the area to image coordinates based on the location of the image capturing device in relation to the fixed objects.

The term "fixed object" refers to a physical object or a portion thereof that does not move in relation to an image capturing device while a sequence of images is captured. Accordingly, when an image is captured by the image capturing device, the fixed object may be readily identified on the image without performing any object recognition analysis such as executing an ML model but rather based on predefined logic. For example, for a fixed traffic control camera of an intersection, the traffic area of the intersection on an image is mapped to the coordinates on the image. Any image in the sequence of images captured by the camera has the curbs of the intersection depicted in the same locations of the images. Accordingly, when an ML model detects a pedestrian in a motion event, the system may determine whether the pedestrian in motion was on the road or on the curbside without detecting the fixed object of the curbsided but rather using the image coordinates of the curbside on the image.

In an embodiment, a number of different metrics may be calculated based on the detection and classification of objects and related events. For example, a number of a particular type of events in a particular time period may be calculated for a particular area captured by one or more image capturing devices. As another example, engagement effectiveness metrics may be calculated based on a number of object attention events (in which one object engages with another object) over the number of any object detection (with or without an attention event). Additionally or alternatively, metrics related to a different type of events may be combined to generate new metrics.

Example Application of Image Data Analysis

As an example, image data analysis computer system may employ the techniques for tracking objects and identifying events based on captured image data in the retail industry. The data analysis of customer patterns enables more optimal premises layout, innovative on-premises concepts based on user interactions with products or lack thereof.

The perception and insights gathered from different patterns exposed by users might differ across the retailers. To take this into account, the system may have specific definitions for what qualifies as a captured event, which may be user-defined depending on the specific needs. For instance, some retailers might deem an event to have occurred if a higher frequency of traffic is registered around certain shelves (coupled with the notion of attention), while others may consider the higher amount of time spent around certain shelves, in addition to some type of interaction, as an occurrence of an event. Based on such types of events, an Engaged Traffic Index example metric is defined herein.

Using one approach to calculate such metrics, a sequence of input images of frames with distinct human objects is captured with image capture device(s). Using the image data, the human object's path trajectory in a retail environment and a visualization of the human object's interaction with products is automatically reconstructed. With custom definition(s) of events, an attention map describing the interactions of human objects with store shelves/bins is generated employing a CNN neural network. More specifically, in this example, the techniques enable the detection of segments of shelves, fixed objects, which get more attention as compared to other segments in the given layout of the retail environment. As an illustrative example, the system generates an output of an attention map to visualize a retail store and the interaction of shoppers with store shelves/bins. More specifically, in such an example, the techniques herein describe detecting different levels of attention as compared to other shelves/segments in a given retail store layout using statistical methods.

The term "useful events" refers herein to user interaction such as, for the retail environment, an occurrence of user-product interaction (or, as also referred herein as "engagement" or "engagement event"). An example of a useful event is an attention event when a detected human object is identified as paying attention to a particular shelf (or a portion thereof) in a store.

In an embodiment, a human object may exhibit patterns throughout the trajectory, which, upon the detection, the system generates one or more events for. The aggregate of all segments where the user and product interaction occurs is referred to as "aggregate useful events" with respect to the trajectory. The ratio of such "aggregate useful events' measured in duration/distance to the trajectory's overall duration/distance is the basis for the Engaged Traffic Index. In an embodiment, the Engaged Traffic Index is determined by averaging such ratios generated for given premises (or an area/segment thereof) in a given timeframe under consideration.

Useful events may be customized by the retailers' type and include other types of user engagement, such as approaching vendor displays, picking up demo products, interacting with the sales personnel, etc. The novel and universal concept of the Engaged Traffic Index will then be redefined accordingly based on such types of broader events.

Using the result data of the techniques described herein, the stores may have substantially more optimal ways to sort and arrange the sets of available merchandise that best match user needs, saves time, and make improvements to the overall retail experience, thus increasing revenues.

Functional Overview

FIG. 1 is a flow diagram that depicts the process for object and event detection and classification for generating metrics in an embodiment. One or more of the steps described below may be omitted, repeated, and/or performed in a different order. Accordingly, the specific arrangement of steps shown in FIG. 5 should not be construed as limiting the scope of the invention. Further, the steps shown below may be modified based on the data structure used to store the data.

The described example process is represented schematically via different stages of steps that the computer system performs. Steps 105 to 115 represent the process for generating an ML model, such as CNN, for detecting and classifying object(s) and event(s) and may be performed offline (independent of image capturing device(s)). Steps 120-145 represent the process of detection and classification of a sequence of images with the trained ML model.

Object Detection

In an embodiment, at step 105, the process obtains training data set of images that contains annotations identifying object(s) and/or events associated with the object(s). At step 107, the process trains an ML model with the training data set. To train the neural network model to detect human objects and other objects, a publicly existing large dataset of images (COCO, Pascal VOC) is provided as an input. Such a dataset has hundreds of thousands of annotated objects, taken delimited with a box to indicate an identified person, etc. As an output, the trained model provides identification of objects, as an example, using a frame around the object in the image. The model is trained until the desired accuracy is reached.

In one embodiment, the process may proceed to step 120 for performing classification. In an alternative embodiment, the process may additionally fine-tune the ML model with a different data set, at step 115. This step may be performed especially for off-the-shelf ML models obtained from third party data stores at step 110. For example, a pre-trained deep convolutional neural network ML model may be used to implement an object detection solution.

In such an embodiment, the training data set with which the initial ML model is trained may be different in format and/or substance of images from image capturing device(s) to be classified. For example, the annotations may be labeling only human objects and not the event type(s) that are to be detected, and/or the training data set images are from a different type of camera (e.g., with conventional, wide-angle, or fish-eye lenses). Accordingly, the ML model at step 107 or at step 110 may not accurately classify the images captured by an image capturing device.

To increase accuracy for detecting human objects and other relevant objects and related events, at step 115, the ML model is further fine-tuned for the specific image formats and substance that the ML model will be used for classifying new images. For example, annotated images from the fish-eye cameras (for other purposes) are customized to the solution and used for further fine-tuning of the ML model. Fine-tuning the ML model using datasets of the existing annotated images that are very close in content to the expected input (e.g., a sequence of fish-eye captured images) is substantially more efficient as opposed to solely training a deep convolutional neural network on the existing annotated images. That is, the finally obtained fine-tuned model works well on tens of thousands of the existing images obtained from fish-eye cameras. As a result of a sufficient number of training cycles and fine-tuning, the ML model is capable of detecting persons in the data set representing new (and different) images with high precision.

Using the techniques described above, the ML model may distinguish human objects and inscribe those into a rectangle (and deliver that rectangle's coordinates). Techniques are further described to detect attention event occurrence(s). In an embodiment, images are annotated into two classes of objects: users paying attention to a product and users not paying attention. Using the technique mentioned above (training the ML model with a data set that includes annotated images of users paying attention and not paying attention), the ML model may further identify whether a user had an attention event or not, in addition to identifying the user itself.

At step 120, an image capturing device captures a sequence of one or more images of the premise (or a segment thereof). In an embodiment, the sequence of images is provided as an input to the ML model, which identifies the human object(s) in every image (if any), at step 123. The model may return a human object inscribed in the rectangle for every image (and the coordinates of that rectangle). The human object is detected to analyze patterns and interactions with other objects and make further inferences based on aggregate patterns from multiple users.

Path Reconstruction

At step 125, the process may track identified objects, e.g., human objects, across the image frames of a sequence of images. By identifying the same corresponding object on sequentially captured images, the process may correctly quantify a number of unique human objects (e.g., users) and events associated with the objects, and thereby reconstruct the path of the object through the premises.

In an embodiment, sequentially captured images are processed with an ML model trained to recognize the same objects in multiple image frames (e.g., Deep Sort algorithm). As a result, the sequentially captured images may be augmented with a unique id for each of the human objects, thereby tracking the human objects across the image frames in a sequence of captured images. The output complements the ML model that implements object detection with a unique id for each object. Using this algorithm, a human object may be tracked across the image frames.

Figure 3:
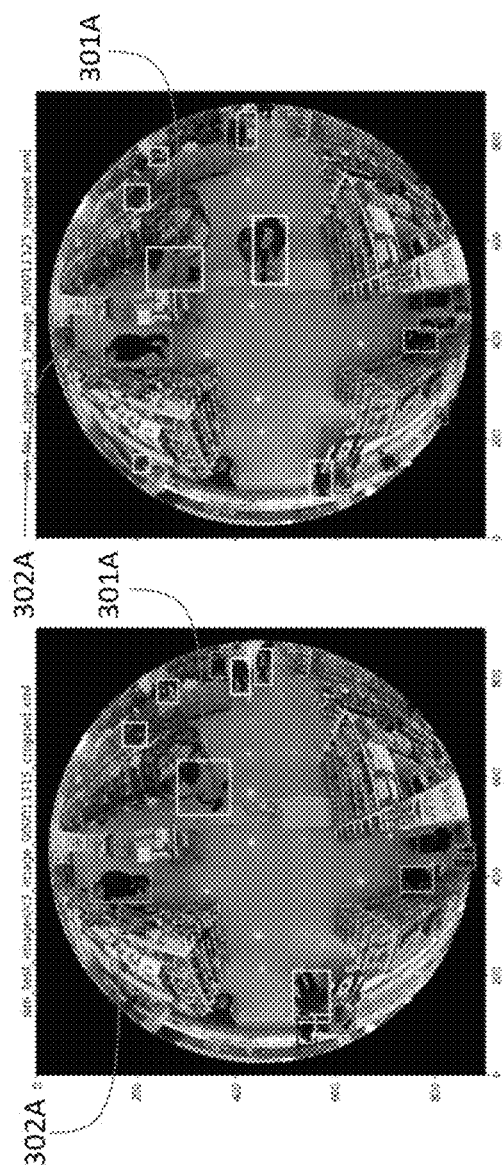
FIG. 3 is an image depicting correspondence of identified objects in a sequence of captured images, in an embodiment.

FIG. 3 is an image depicting correspondence of identified objects, in an embodiment. In FIG. 3 example, for two sequential images extracted from fish-eye camera output, unique identifiers 301A and 302A have been assigned to users encompassed in respective image frames.

Figure 4:
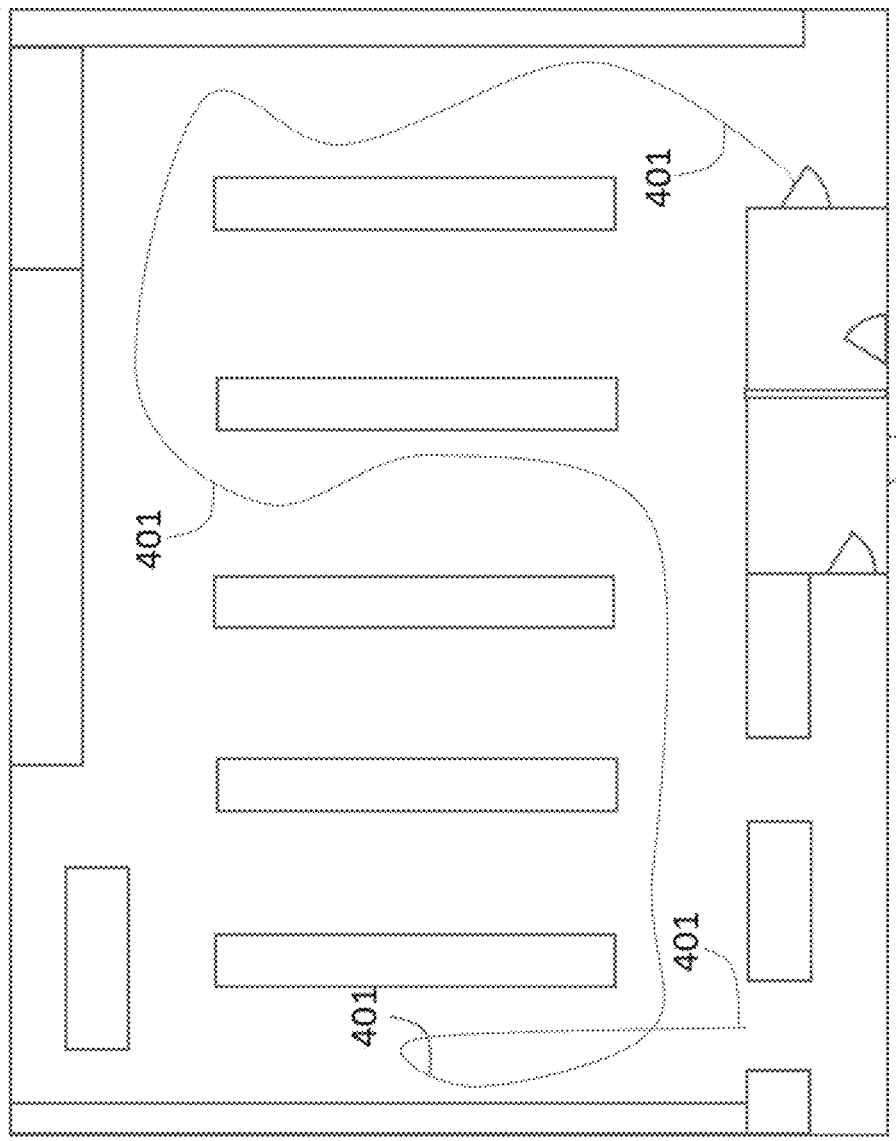
FIG. 4 is a block diagram that depicts an example reconstructed trajectory, in an embodiment.

Continuing with FIG. 1, at step 130, the trajectory for an identified moving object is determined. FIG. 4 is a block diagram depicting a detected human object trajectory. The process identifies distinct human objects across sequential image frames (within bounds of one camera). In an embodiment, the system performs it by using the Deep Sort algorithm. For example, the ML model has identified in an image frame 'a', 'b','c' human objects, and then in the next image frame, the ML model has identified different 'd', 'e', 'f' human objects. A human object 'a', is compared with human object 'd', human object 'b' with 'e', and, finally, human object 'c' with human object T. A specially designed Deep Sort algorithm solves this correspondence problem using Kalman filters that arranges the human objects from most similar to least similar. Once all identified objects are compared, the correspondence is determined, and the respective labels may be changed to the label of the corresponding object in the previous frame.

Continuing with the example in FIG. 4, the start of the trajectory matches the moment when the user was first detected, and the ending point is when the user tracking ended (the most typical scenario is when the user left the premises). FIG. 4 illustrates an example of a reconstructed trajectory (401). An image frame from a camera may be provided as an input to the deep convolutional neural network model that implements object detection to analyze visual images. The model may identify a human object and returns the x, y coordinates of her center of gravity. These points then form a human object global trajectory (relative to the premises' layout conventional point of origin).

Additionally or alternatively, the system may track identified objects throughout multiple cameras (including the overlapping regions) to reconstruct the global trajectory. Using the Hungarian algorithm that utilizes the spatially defined distance, a particular object may be tracked across the images captured from multiple cameras.

To do so, in an embodiment, a sequence of image frames are captured by multiple cameras (e.g., fish-eye cameras) installed on the premises. When two or more cameras are capturing images, the captured locations may include overlapping segments of the premises. Doing so minimizes any uncovered segment of the premises but creates a technical problem in tracking the same human object or multiple human objects throughout these overlapping regions to obtain a fully reconstructed global path corresponding to each of the human objects. Also, for some types of cameras, image distortion is another type of problem. A typical example of image distortion is when objects in the central area change their shape as they move closer to the edge of the image. The problem of matching the same objects in subsequent images is solved here not only for 360-degree fish-eye cameras where the effect of images' distortion is significant, but it is also solved for other types of cameras where the distortion is minimal.

To track objects (such as human objects) within bounds of multiple cameras, when an object transitions from the segment of premises predominantly in the field of view of one camera to the segment in the field of view of another, the two cameras have to have at least one image (per camera) where the same object appears simultaneously near simultaneously.. Two or more 360-degree fish-eye cameras may be used to watch overlapping segments of the premises to leave no uncovered segment of the premises.

Figure 10:
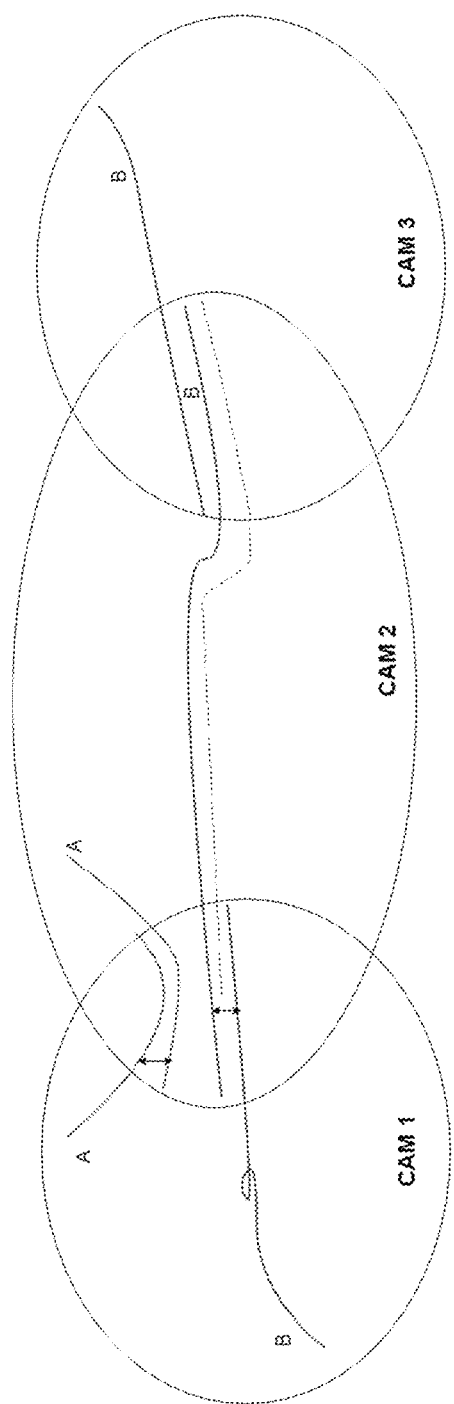
FIG. 10 is a diagram that depicts a schematic trace of motion by human object A and human object B within the image capture area of cameras, in an embodiment.

FIG. 10 is a diagram that depicts a schematic trace of motion by human object A and human object B within the visibility area of Camera 1, Camera 2, and Camera 3, including some overlapping regions of visibility for the aforementioned cameras, in an embodiment. FIG. 10 illustrates tracking of the human object or multiple human objects throughout the overlapping regions to obtain a fully reconstructed global path corresponding to each of the human objects. In an embodiment, the system determines attention events for each of the human objects throughout their respective global paths.

In FIG. 10, overlapping segments of premises are captured as a result of the simultaneous watch through three fish-eye cameras. The techniques described herein identify and separate tracks corresponding to the motion of human object A of FIG. 10 from those corresponding to motion of human object B of FIG. 10.

The task of human object assignment for consecutive images obtained within the bounds of a single camera is performed as discussed above (specially designed Deep Sort algorithm that solves this correspondence problem using Kalman filters). For detecting a consumer across multiple segments, at least a pairwise consecutive overlapping of cameras is maintained (Camera 1 has an overlapping region only with Camera 2, and Camera 2 has an overlapping region only with Camera 3). Human object A in FIG. 10 is visible from Camera 1 and Camera 2. Human object B in the same figure is visible from Camera 1 and Camera 2, and at the same time, the further motion of human object B is visible simultaneously from Camera 2 and Camera 3, and then finally motion of human object B is visible only from Camera 3. Thus, using the overlapping regions of the camera, human object B is tracked from the region of Camera 1 to the region of Camera 3.

FIG. 10 is a diagram that depicts a schematic trace of motion by human object A and human object B within the visibility area of Camera 1, Camera 2, and Camera 3, including some overlapping regions of visibility for the aforementioned cameras, in an embodiment. The motion of human object A and human object B, in this example, falls within the visibility area of Camera 1 alone and within the visibility area of Camera 1 and Camera 2. Furthermore, human object A disappears, and only human object B is within the visibility area of Camera 2. Finally, human object B could be observed in the overlapping segment for Camera 2 and Camera 3, and then as the last state, human object B could be observed only within the visibility area of Camera 3.

For the integrated human object tracking system to track human object(s) based on the captured frames from the overlapping cameras, the Hungarian assignment algorithm, together with specially defined distance metrics, are used to reconstruct the global path from local paths or tracklets (so-called local trajectories). Hungarian assignment may use a matrix method to solve assignment detection for tracklets generation.

Accordingly, the system may obtain the global trajectory of a human object by relating these local trajectories outlined above for human object A and human object B. To detect the relationship, for example, only by Camera 1 and Camera 2 overlap, the system calculates a special distance metric by calculating all pairwise distance metrics between local paths corresponding to human object A in Camera 1, human object A in Camera 2, human object B in Camera 1 and human object B in Camera 2. These distances are provided as an input to the Hungarian assignment algorithm, and the algorithm (with high precision) identifies the corresponding local paths serving as a continuation of one path for another as an intermediate result. Furthermore, the Hungarian algorithm is implementing smoothing of those already matched local paths. An example of such a smoothing (dashed curve) is depicted for human object B that could be seen in the overlapping region for Camera 1 and Camera 2 and then continued into the area of visibility for Camera 2. Having solved that global path reconstruction subtask for human object B and having that corresponding smoothed path (dashed curve) obtained at the output, the system may perform the steps for the overlapping region for Camera 2 and Camera 3 specifically for human object B. In a similar fashion, provided that the distance metric between that reconstructed dashed smoothed path (obtained as output in the previous step) and the local path for human object B in Camera 3 is minimal across all available distance metrics, those numbers and corresponding matching local paths are passed again to the Hungarian algorithm, and the local path correspondence problem is solved again. As an output of this process, yet another smoothed path is produced (i.e., an imaginary dashed line), which is obtained by smoothing the existing dashed line received at the output of the previous step and the local path corresponding to human object B within the area of visibility for Camera 3. Accordingly, the human object B is identified and tracked for the overlapping region of Camera 2 and Camera 3, and correspondence of motion of human object B in that overlapping region to the motion of human object B within the area of visibility for Camera 3 is established.

Similar techniques may be applied when all three cameras have a common overlapping region. For example, a human object tracking is performed with Camera 1 and Camera 2 and a smoothing line (corresponding to the dashed line in the example above), approximating the local trajectory pertaining to the same human object is obtained. Furthermore, that approximated dashed line is deemed as the combined output of Camera 1 and Camera 2, and the process is repeated iteratively for that output and a corresponding local path for that human object obtained within the area of visibility of Camera 3. In case if there are more than three cameras involved, this very process is repeated consecutively until all cameras that have overlapping regions are processed.

Event Identification

In an embodiment, continuing with FIG. 1, the process determines attention event(s) for each of the human objects throughout their respective paths, at step 135. The ML model is trained and/or fine-tuned to detect and classify events (at step 115 and/or 107).

Figure 2:
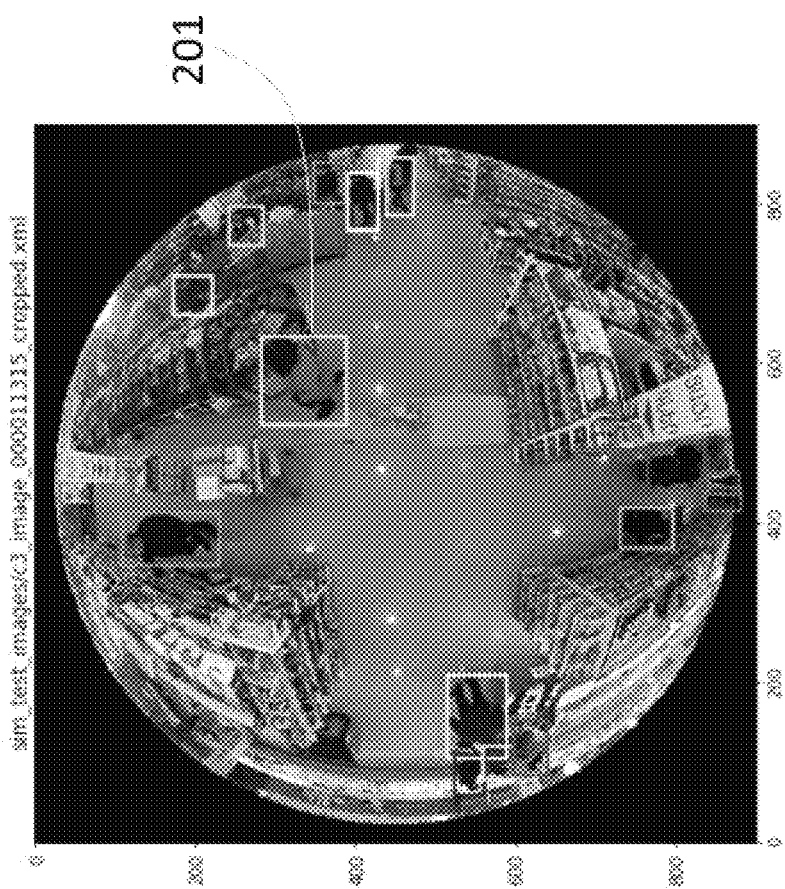
FIG. 2 is an image that depicts a detected person with a detected attention event in a captured image frame, in an embodiment.

FIG. 2 is an image that depicts a detected person with a detected attention event in a captured image frame, in an embodiment. FIG. 2 also illustrates, albeit inexplicitly, the detected attention event for a human object 201. In one embodiment, having the reconstructed trajectories for each of human objects (relative to the premise's layout conventional point of origin), the system may detect the attention events that the human objects exhibit along these trajectories.

In an embodiment, three separate categories of events may be classified into: 1) a passive object event, when detecting existence of an object without an interaction with another object (i.e., human object is not paying attention to other objects), 2) an attention event captured for an object with another (i.e., human object interacting with a fixed object), and 3) an inanimate object-only events. Accordingly, an identified human object in each image frame may have one of the following types: 1) human object which exhibits no explicit attention to a product, 2) human object who exhibits explicit attention towards a product, and 3) events for inanimate object types like shopping carts, baskets, etc.

Continuing with FIG. 1, at step 140, the process determines if a detected object has interacted with a fixed object. The fixed object may be identified without an ML model. Rather, a fixed-position image capturing device captures images of the same area of the premises. Thus, if the area contains fixed object(s), such fixed objects may be identified based on the mapping information for the layout of the area. The mapping information maps the fixed objects within the layout of the area to image coordinates of the image capturing device.

In one embodiment, if an event (e.g., attention event) is detected for an identified human object, a segment of 120 degrees approximately corresponding to the span of human eye vision is virtually constructed for a given short timeframe. Any fixed object within the segment may qualify for the attention event with the human object. The segment could be configurable and may be based on the movement direction.

For example, to detect events of human objects, each shelf is logically divided into bins, and each bin is assigned a unique Bin ID. For the detected attention event, the bin(s), which are within the segment, have been interacted with and are qualified for the attention event.

At step 145, metrics for the detected event(s) associated with a classified object and a fixed object are calculated. The calculation of the metrics may include aggregation of detected events (and counts thereof) temporally and/or location-based using any one or more statistical functions such as mean, median and standard deviation. One example of such metrics may be a count of the detected events per fixed object over a particular time period. For example, for each bin, the system may maintain an attention value that is modified (e.g., incremented by one(1)) at every instance that an event is detected for the bin by any classified human object. An example of a detected attention event exposed by human object 201 for a given bin of a shelf was already illustrated, albeit inexplicitly, in FIG. 2.

Attention Map Generation

Figure 5:
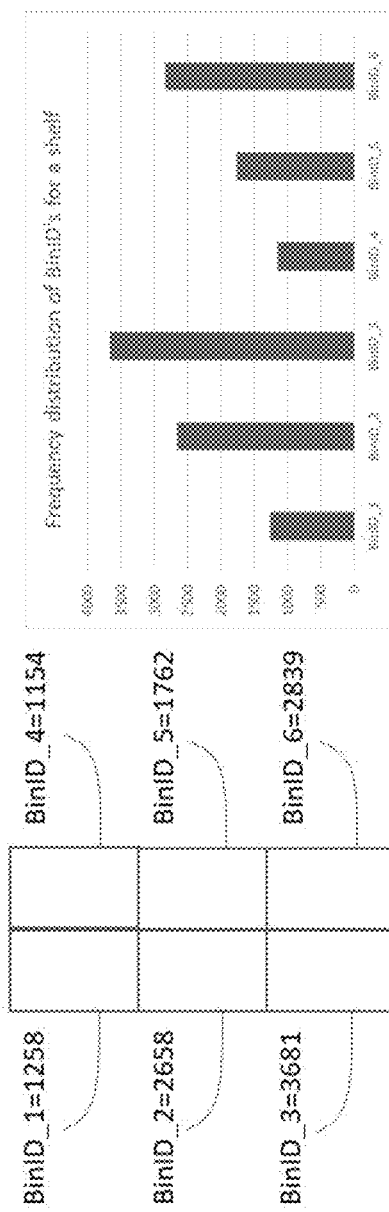
FIG. 5 is a diagram that includes a bar chart depicting an aggregate of attention events for a fixed object per a defined period of time, in an embodiment.

A dataset of detected and reconstructed global path trajectories with a binary response (paying/not paying attention) recorded for all identified human objects is generated by the system, in an embodiment. FIG. 5 is a diagram that includes a bar chart depicting an aggregate of such attention events for a fixed object per a defined period of time, in an embodiment. The frequency bar chart represents the number of occurrences of a particular value or characteristic. In this case, the height of the column shows the attention events frequency for a specific bin based on "Bin ID." In other words, for example, for a given period of time, the bin with the label "BinID_3" has been associated with 3681 attention events and BinID_5 with 1762 attention events, respectively.

Figure 7A:
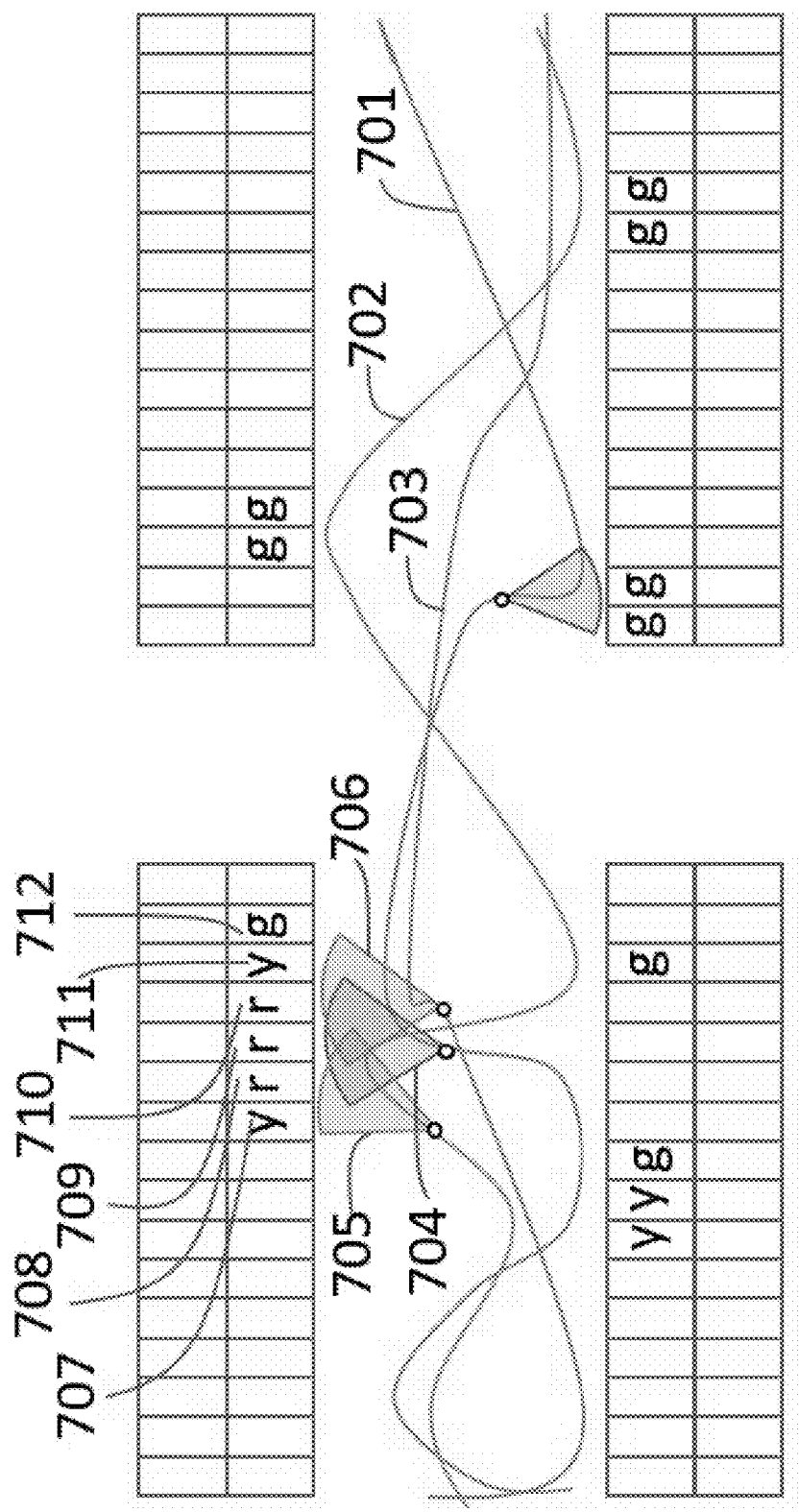
FIGS. 7A and 7B are diagrams that depict a graphical representation of the superposition of attention events, in one or more embodiments.
Figure 7B:
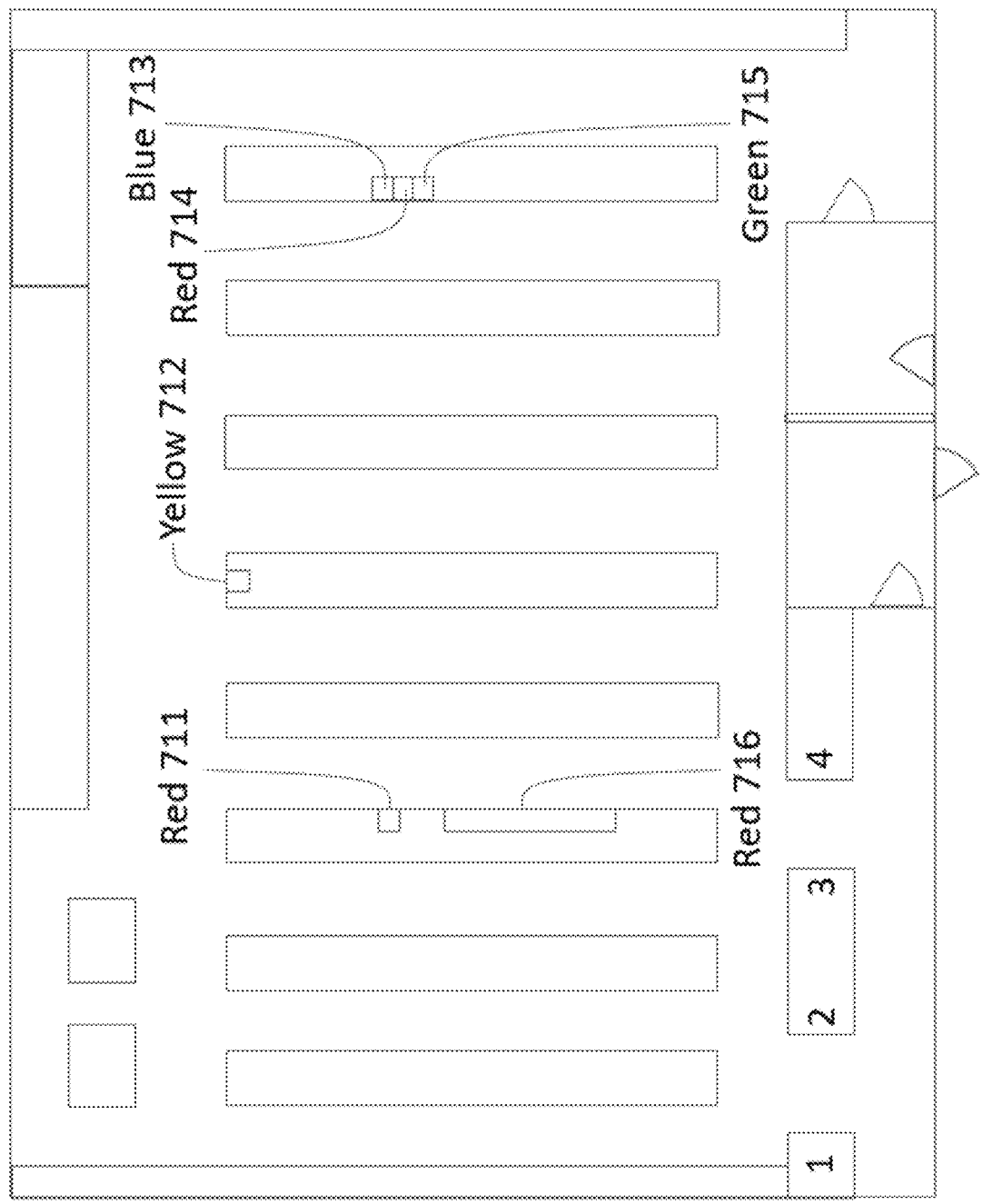

FIG. 7A/B are diagrams that depict a graphical representation of the superposition of attention events, in one or more embodiments. FIG. 7B is a heatmap of the superposition of atomic attention events that are illustrated in FIG. 7A.

Figure 6:
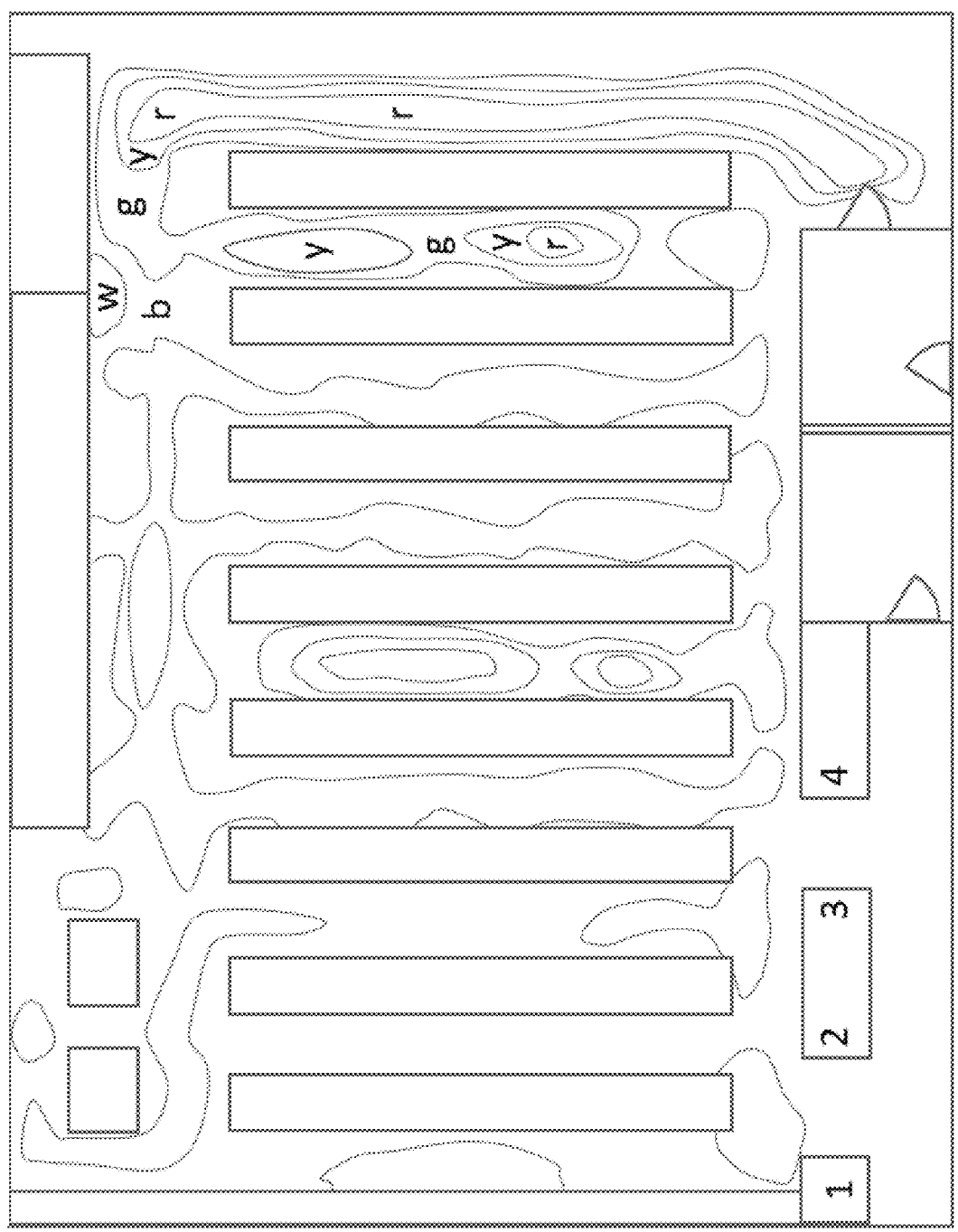
FIG. 6 is a diagram depicting the heatmap that reflects the traffic around segments of premises, in an embodiment.

FIG. 6 is a diagram that illustrates an example of a heatmap, reflecting the traffic around particular segments of the same premises per fixed period, in an embodiment. In FIG. 6, five (5) different colors are used, and the corresponding regions are indicated as 'w' for white, 'b' for blue, 'g' for green, 'y' for yellow, and 'r' for red. The colors are used to indicate various intensity levels of traffic around shelves. For example, the white color denotes the detected absence of traffic or zero traffic intensity level, and the red color implies the highest traffic intensity level.

Continuing with FIG. 7A, FIG. 7A illustrates an example of an attention map generated based on the example of three reconstructed global path trajectories. The three reconstructed global paths for three distinct human objects indicated as '701', '702', and '703'.

Referring to the upper left corner of FIG. 7A that represents a particular shelf, for human object '1' (which has '701', an imaginary circular sector '704' corresponding to human's eye vision span) is depicted. Human object '701' exhibited attention event relative to five bins: those are three middle ones marked '707' (y), '708' (r), '709' (r), '710' (r), and also the leftmost bin, as well as the bin to the right of three bins.'711' (y). Similarly, human object '2''702' (which has an imaginary circular sector '705') exhibited attention event relative to four bins: the leftmost bin and that already had a detected attention event from human object '1' and the three adjacent bins and '707' (y) bin that already had a detected attention event from human object '1''701' and the three adjacent bins: '708' (r), '709' (r), '710' (r) which in their turn already had a detected attention event from human object '701'.

Human object '703' (which has an imaginary sector '706' representing the field of view) exhibited attention event relative to five bins: a) three bins '708' (r), '709' (r), '710' (r), for which the attention events have been detected from human objects '701' and '702', b) the '711' (y) bin to the right of those three bins, for which an attention event from human object '701' has already been detected, and, c) the rightmost '711' (g) bin, for which an attention event has only been detected from human object '703'.

To summarize, for this particular example, the bins may have different attention levels and may be assigned different colors corresponding to the levels when generating an attention map. In the example above, the bins with an attention event exhibited by only one out of three human objects may be colored green, which is indicated by the letter 'g' next to the bin ID, the ones that have a detected attention events exhibited by two out of the three human objects may be colored yellow, which is indicated by letter 'y' and finally, the ones that have attention events exhibited by all three human objects may be colored red, which is indicated by letter 'r'. The bins, which had not registered any attention event for that period of monitoring, are colored white, which could be indicated by the letter 'w' (not depicted in the current drawing).

Attention map, which may be generated based on an example in FIG. 7a may have a similar color scheme as in FIG. 6. These are five (5) colors that are used conventionally to depict intensity, such as in FIG. 6. Attention map, in its turn, represents the concentration of attention events ranging from no attention (e.g., indicated with "white") to the highest observed attention frequency (e.g., indicated with "red").

FIG. 7B is an example drawing that is generated based on the superposition of all the attention events, an attention map, for all reconstructed global path trajectories for all human objects (see examples depicted in FIG. 7a) and depicted in style similar to that of the heatmap in FIG. 6. FIG. 7b presents an example of a dataset of all detected and reconstructed global path trajectories with a binary response (paying/not paying attention) obtained from all respective human objects per fixed period matching the time period, as presented in the example of FIG. 6.

Additionally, in FIG. 7b, the concentration of attention events ranging from lowest (colored white) to blue, e.g., 'Blue 713' to yellow, e.g., 'Yellow 712' to green, e.g. 'Green 715' and finally to the highest concentration colored red and marked as, e.g., 'Red 714' or 'Red 716' is indicated in relation to the premises' shelves/bins. The selection of the color is determined based on assigning the five conventional colors to attention events intensities obtained from the superposition of attention events that the human objects exhibit along their reconstructed global trajectories. Any other color scheme may be used; the selection of the particular color scheme is not critical to the approaches described herein. Similar to the example with distinct human objects indicated as '701' in the above sections and the corresponding bins '708' (r), '709' (r), '710' (r), which attained the most attention (each of 3 distinct human objects exhibited attention events relative to those bins in a given timeframe), FIG. 7b depicts generated superposition of attention events exhibited with respect to respective bins along reconstructed global trajectories. The bins (or clusters of adjacent bins) that attained the most intense frequency of attention events are indicated as red, e.g., 'Red 714' or 'Red 716' in FIG. 7b, while others which are falling in the next lower range with respect to the conventional color scheme mentioned in this section, are indicated as, e.g., 'Yellow 712' in FIG. 7b and so on in descending order down to the white color indicating no concentration of attention events (not depicted in FIG. 7b). In total, five (5) ranges are corresponding to the coloring scheme mentioned with respect to FIG. 6 and FIG. 7b.

Comparison of FIG. 6 and FIG. 7b reveals the principal difference between these two example maps. For example, while there is an apparent heavy traffic volume observed along with the rightmost shelf in FIG. 6, the aggregate concentration of attention events, as depicted in FIG. 7b is decreasing in between 4th and 5th shelves (counting from left to right).

Figure 8:
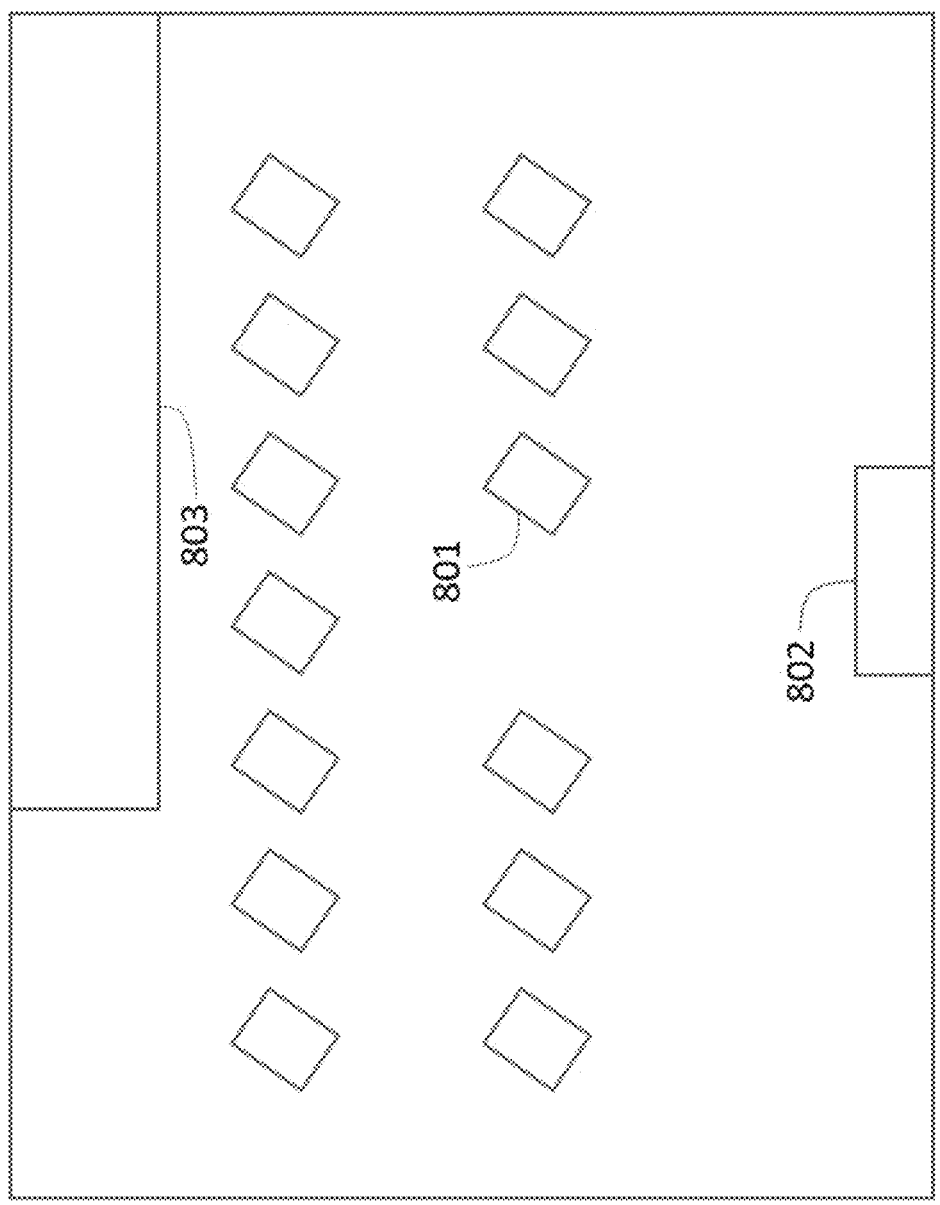
FIGS. 8 and 9 are diagrams depicting a layout of different premises, for which different types of metrics for attention events are generated, in an embodiment.

FIG. 8 provides another example of the application of techniques described herein. The main venue maybe a car dealership, as depicted in FIG. 8. The attention attracting objects are now cars, such as car 801. In some alternative embodiment, as shown in part by FIG. 9, the alternative definition of events may lead to a different type of attention map generated.

Figure 9:

FIG. 9 depicts a different type of superposition of attention events generated for the main venue of a car dealership using the same approach as above (i.e., using annotated image data as an input, fine-tuning the deep convolutional neural network model that implements object detection to detect attention events). The layout of an example of such a unit is depicted in FIG. 8.

These different types of attention maps are based on the definition of distinct attention events. The attention events may be configurable and, as part of the configuration, may be defined based on the specific metric configured. In an embodiment, the detection of attention events is annotated on captured image data, and the deep convolutional neural network model that implements object detection is fine-tuned a sufficient amount of times using the annotated image data input. The resulting model is capable of detecting attention events on its own. Using, as an example, the above-described color convention, the drawing of FIG. 9 depicts an example of the concentration of attention events (for a fixed timeframe) for cars, 901, ranging from low (e.g., colored white) to high (e.g., colored red).

The attention maps (FIGS. 7B, 9) and other metrics generated from the detected human objects and identified events may provide the means to increase the existing efficiency. Any level of aggregation for the generated metrics may be performed (store-level, chain-of-stores-level, state-level) and thus represent a broader attention map.

Software Overview

Figure 11:
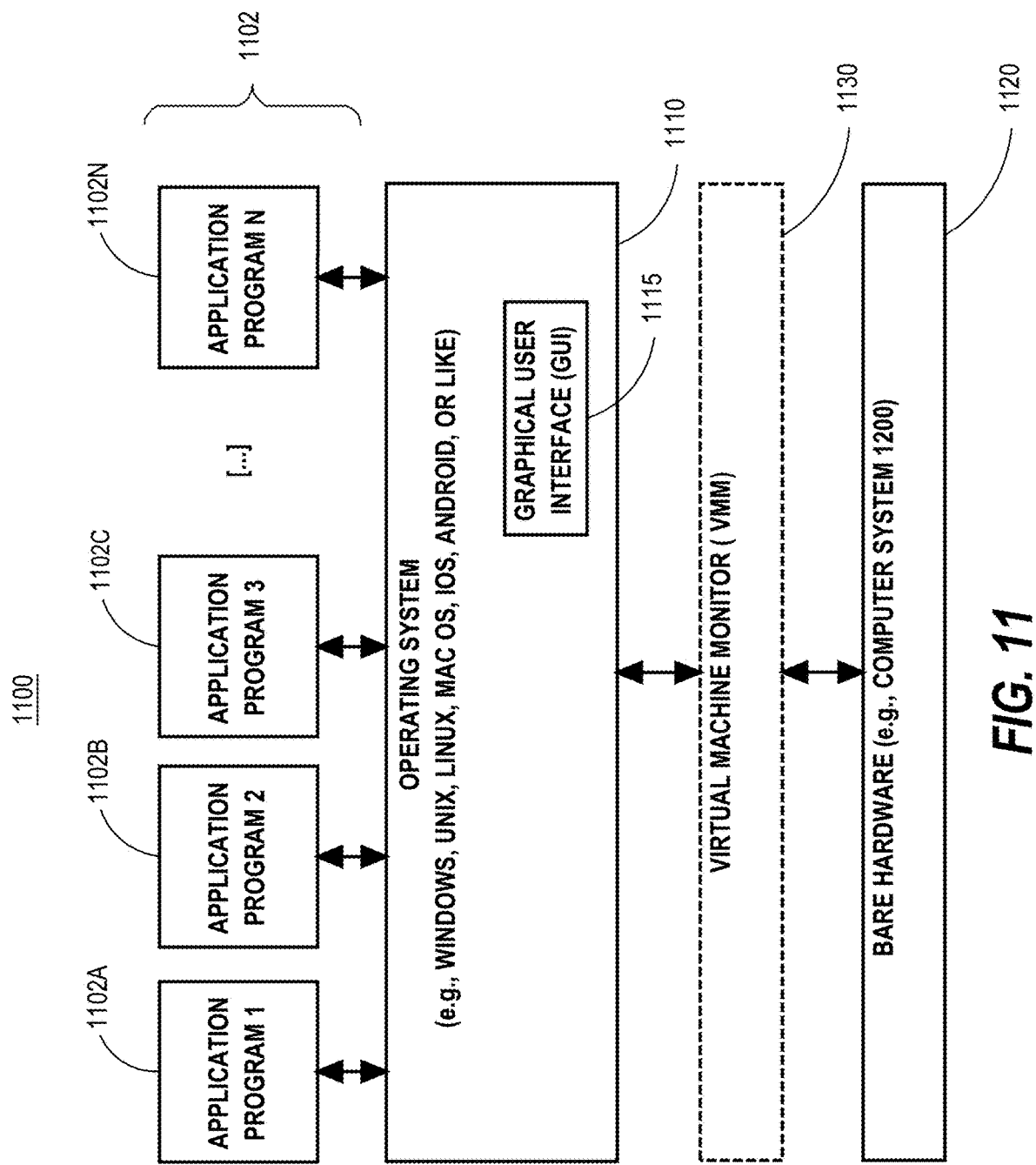
FIG. 11 is a block diagram of a basic software system, in one or more embodiments.
Figure 12:
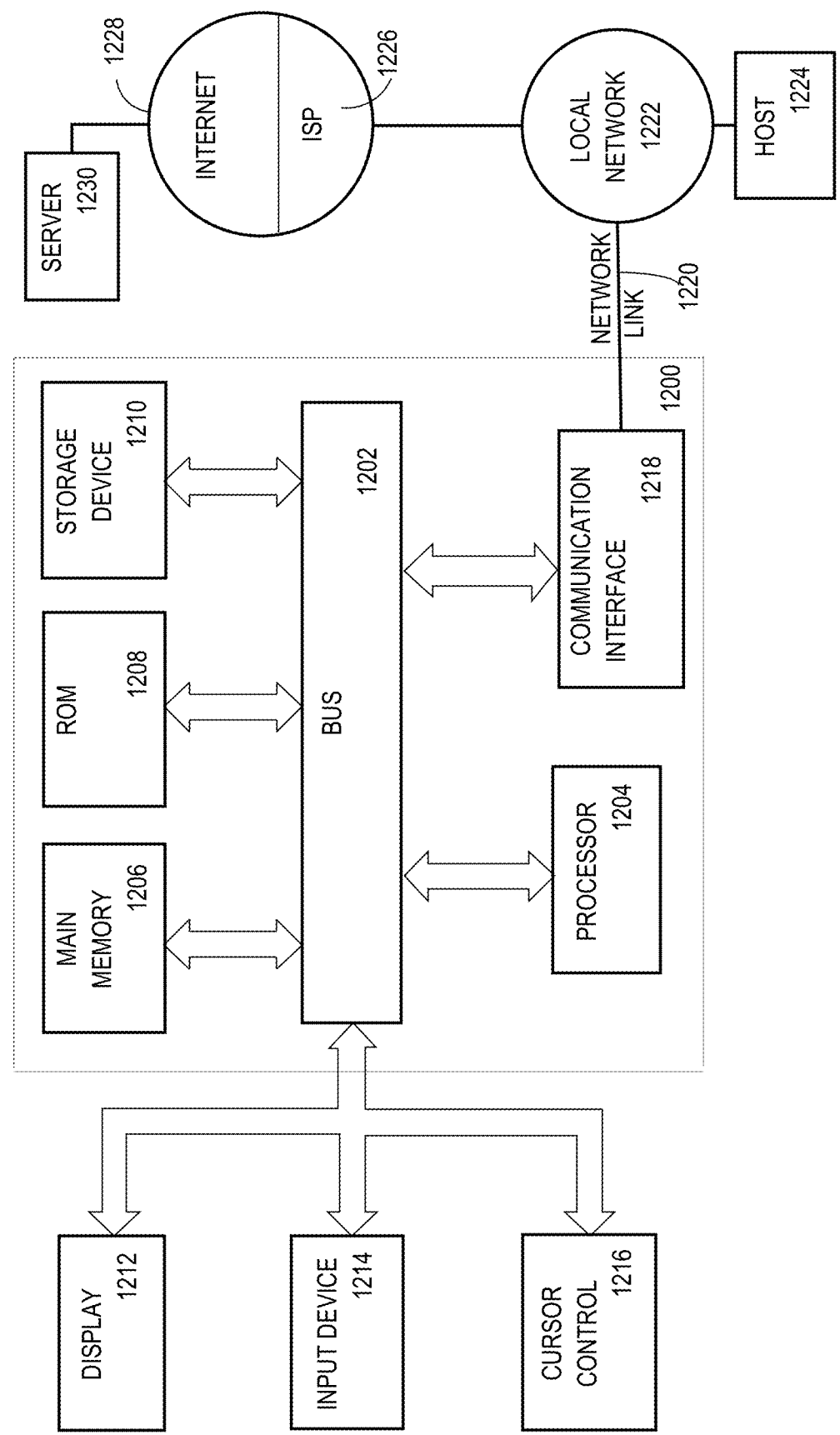
FIG. 12 is a block diagram that illustrates a computer system upon which an embodiment of the invention may be implemented.

FIG. 11 is a block diagram of a basic software system 1100 that may be employed for controlling the operation of computing system 1200 of FIG. 12. Software system 1100 and its components, including their connections, relationships, and functions, are meant to be exemplary only and not meant to limit implementations of the example embodiment(s). Other software systems suitable for implementing the example embodiment(s) may have different components, including components with different connections, relationships, and functions.

Software system 1100 is provided for directing the operation of computing system 1200. Software system 1100, which may be stored in system memory (RAM) 1206 and on fixed storage (e.g., hard disk or flash memory) 1210, includes a kernel or operating system (OS) 1110.

The OS 1110 manages low-level aspects of computer operation, including managing execution of processes, memory allocation, file input and output (I/O), and device I/O. One or more application programs represented as 1102A, 1102B, 1102C . . . 1102N may be "loaded" (e.g., transferred from fixed storage 1210 into memory 1206) for execution by the system 1100. The applications or other software intended for use on computer system 1200 may also be stored as a set of downloadable computer-executable instructions, for example, for downloading and installation from an Internet location (e.g., a Web server, an app store, or another online service).

Software system 1100 includes a graphical user interface (GUI) 1115 for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1204) of computer system 1200. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1200.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1200 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model that enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or another communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random access memory (RAM) or another dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes read-only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal, and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226, in turn, provides data communication services through the world wide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received and/or stored in storage device 1210 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
capturing a first image of a particular area by an image capturing device, the image capturing device capturing a sequence of images that includes the first image and a second image of the same particular area, wherein the particular area includes a plurality of fixed objects;
determining that a first event of a particular event type associated with a first object of a particular object type occurred by providing the first image as input data to one or more ML models, the one or more ML models trained to identify objects of the particular object type and events, of the particular event type, associated with the objects;
determining image coordinate information of the first event identified within the first image;
based at least on mapping data of the particular area to the image coordinate information, determining a particular fixed object, of the plurality of fixed objects of the particular area, with which the first event is associated;
determining that a second event associated with a second object occurred by providing the second image, of the sequence of images, as input data to the one or more ML models;
determining that the second object is the same as the first object by providing the first image and the second image as input to another ML model, wherein the other ML model is trained to detect whether objects in multiple images are the same;
based at least in part on determining that the second object is same as the first object, determining that the second event is same as the first event;
excluding the second event from calculating one or more metrics for the particular event type;
calculating the one or more metrics for the particular event type for the plurality of fixed objects.

2. The method of claim 1, wherein the particular event type is an attention event type, and the method further comprises determining that an attention event associated with the first object has occurred by providing the first image as input data to the one or more ML models which output indicates attention by the first object to at least one of the plurality of fixed objects.

3. The method of claim 1, wherein the particular event type is a passive object event type, and the method further comprises determining that a passive object event associated with the first object has occurred by providing the first image as input data to the one or more ML models which output indicates existence of the first object lacking interaction with other objects.

4. The method of claim 1, wherein the one or more ML models are trained with annotated images from a first type of image capturing device and are fine-tuned with annotated images from a second type of image capturing device different from the first type.

5. The method of claim 1, wherein the image capturing device is a fish-eye camera.

6. The method of claim 1, wherein based at least on mapping data of the particular area to the image coordinate information, determining the particular fixed object, of the plurality of fixed objects of the particular area, with which the first event is associated further comprises determining that the particular fixed object is closer than other one or more fixed objects, of the plurality of fixed objects, to the first object.

7. The method of claim 1, wherein calculating the one or more metrics for the particular event type for the plurality of fixed objects further comprises calculating one or more statistical functions based on one or more counts of events, of the particular event type, that includes the first event.

8. The method of claim 7, further comprising displaying a map of the particular area wherein each fixed object of the plurality of fixed objects has a color corresponding to magnitude of a metric of the one or more metrics that corresponds to said fixed object.

9. The method of claim 1, wherein the particular event type is a first event type and wherein the one or more metrics are further based on event count of a second event type different from the first event type.

10. The method of claim 9, wherein the first event type is an attention event type and the second event type is an passive object event type.

11. A system comprising one or more processors and one or more storage media storing one or more computer programs for execution by the one or more processors, the one or more computer programs configured to perform a method comprising:
  capturing a first image of a particular area by an image capturing device, the image capturing device capturing a sequence of images that includes the first image and a second image of the same particular area, wherein the particular area includes a plurality of fixed objects;
  determining that a first event of a particular event type associated with a first object of a particular object type occurred by providing the first image as input data to one or more ML models, the one or more ML models trained to identify objects of the particular object type and events, of the particular event type, associated with the objects;
  determining image coordinate information of the first event identified within the first image;
  based at least on mapping data of the particular area to the image coordinate information, determining a particular fixed object, of the plurality of fixed objects of the particular area, with which the first event is associated;
  determining that a second event associated with a second object occurred by providing the second image, of the sequence of images, as input data to the one or more ML models;
  determining that the second object is the same as the first object by providing the first image and the second image as input to another ML model, wherein the other ML model is trained to detect whether objects in multiple images are the same;
  based at least in part on determining that the second object is same as the first object, determining that the second event is same as the first event;
  excluding the second event from calculating one or more metrics for the particular event type;
  calculating the one or more metrics for the particular event type for the plurality of fixed objects.

12. The system of claim 11, wherein the particular event type is an attention event type, and the method further comprises determining that an attention event associated with the first object has occurred by providing the first image as input data to the one or more ML models which output indicates attention by the first object to at least one of the plurality of fixed objects.

13. The system of claim 11, wherein the particular event type is a passive object event type, and the method further comprises determining that a passive object event associated with the first object has occurred by providing the first image as input data to the one or more ML models which output indicates existence of the first object lacking interaction with other objects.

14. The system of claim 11, wherein the one or more ML models are trained with annotated images from a first type of image capturing device and are fine-tuned with annotated images from a second type of image capturing device different from the first type.

15. The system of claim 11, wherein the image capturing device is a fish-eye camera.

16. The system of claim 11, wherein based at least on mapping data of the particular area to the image coordinate information, determining the particular fixed object, of the plurality of fixed objects of the particular area, with which the first event is associated further comprises determining that the particular fixed object is closer than other one or more fixed objects, of the plurality of fixed objects, to the first object.

17. The system of claim 11, wherein calculating the one or more metrics for the particular event type for the plurality of fixed objects further comprises calculating one or more statistical functions based on one or more counts of events, of the particular event type, that includes the first event.

18. The system of claim 11, wherein the particular event type is a first event type and wherein the one or more metrics are further based on event count of a second event type different from the first event type.

* * * * *